June 10, 1930.  H. C. PRIEBE  1,762,586
BRAKE GEARING FOR RAILWAY CARS
Filed Oct. 16, 1926
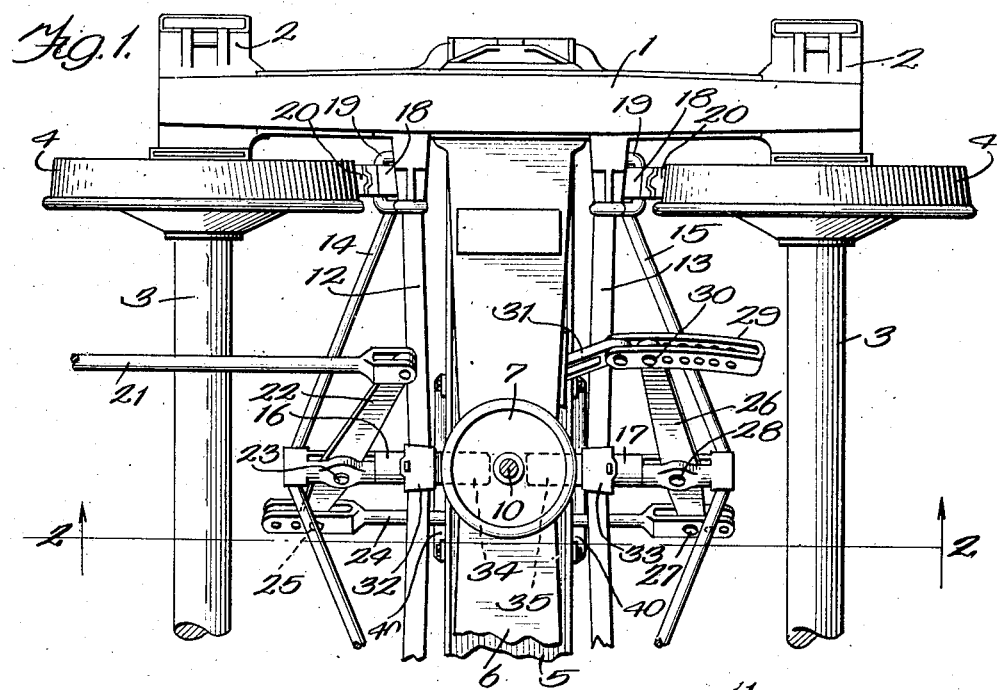
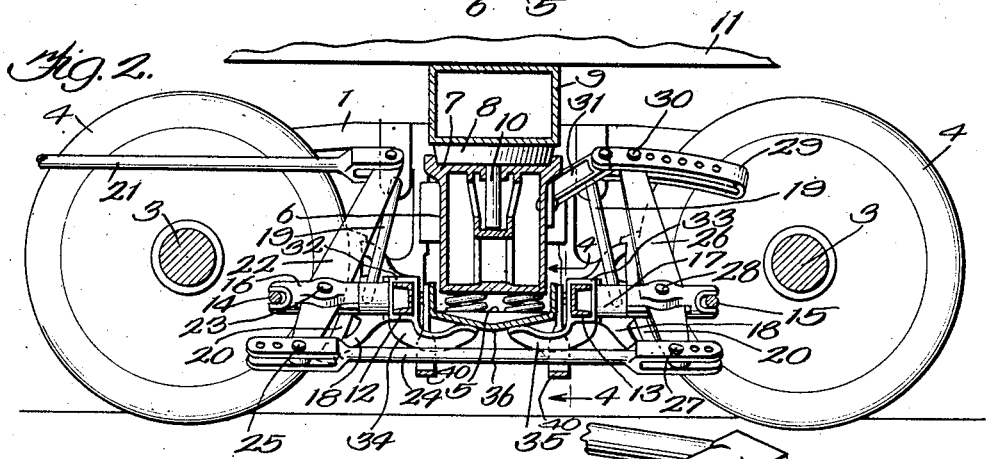
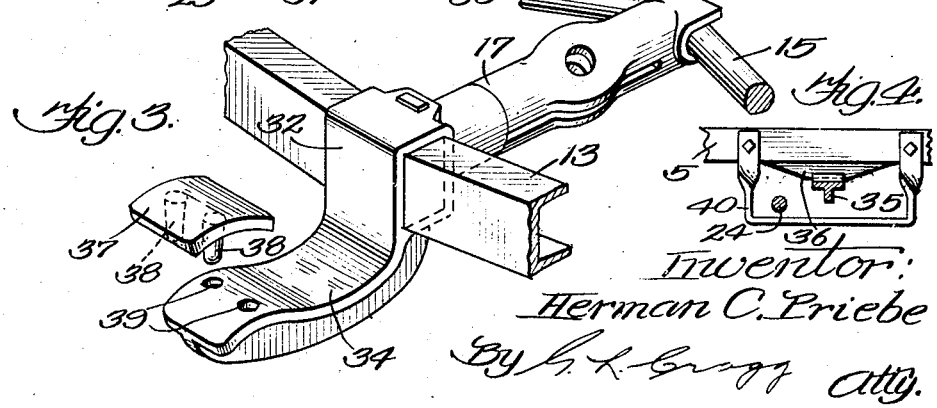
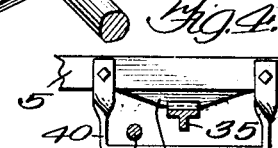
Inventor:
Herman C. Priebe Patented June 10, 1930

1,762,586

UNITED STATES PATENT OFFICE

HERMAN C. PRIEBE, OF BLUE ISLAND, ILLINOIS

BRAKE GEARING FOR RAILWAY CARS

Application filed October 16, 1926. Serial No. 142,009.

My invention relates to brake gears for railway cars of the class employing brake shoe carrying brake beams arranged in pairs, a live lever for operating one of the brake beams of a pair, a dead lever for operating the other beam, and a connecting rod joining the lower ends of the brake levers. The invention has for its object the provision of improved means for maintaining such a relation between the brake beams and the car truck carrying the same as to maintain the brake shoes upon the brake beams in proper relation with the car wheels to which they pertain.

In carrying out my invention, the two brake beams on a truck carry mutually approaching arms which engage a unitary element upon the spring plank of the truck and which unitary element cooperates with said arms to guide the brake beams in their movements, for the purpose previously stated. This unitary element is desirably integrally formed with the spring plank which is preferably made of stamped sheet steel with the element that cooperates with the arms upon the beams stamped therein.

In accordance with another characteristic of my invention, the arms that are provided upon the brake beams to define the movements of the brake beams and the shoes thereon are included in the same unitary structures with the struts that are interposed between the brake beams serving as compression members and rods serving as tension members. When these arms are constituted parts of such unitary structures, the invention is not to be limited to any particular formation upon the spring plank cooperating therewith, nor to cooperation with the spring plank.

The invention will be more fully explained by reference to the accompanying drawing in which Fig. 1 is a plan view of a part of the truck carrying brake beams and having a spring plank equipped in accordance with the preferred embodiment of the invention; Fig. 2 is a sectional view on line 2—2 of Fig. 1; Fig. 3 is a perspective view illustrating a part of the structure of my invention; and Fig. 4 is a sectional view on line 4—4 of Fig. 2.

The truck is equipped with side frames of any suitable construction, one of these side frames being illustrated at 1. Each side frame is equipped with journal boxes, as indicated at 2, which house bearings that receive the ends of the axles 3 for the car wheels 4. The spring plank 5 is carried upon the lower portions of the side frames and carries the springs which support the truck bolster 6. This bolster is provided with the female member 7 of the center bearing which receives the male center bearing member 8 that is provided upon the bottom of the body bolster 9. A king pin 10 depends from the center bearing member 8 and passes through the center bearing member 7. A portion 11 of the car body is shown upon the body bolster.

The brake gear illustrated is inclusive of two cambered brake beams 12 and 13 located between the axles and which constitute the compression members of trusses, two rods 14 and 15, respectively connected with the ends of said beams and constituting truss tension members, and two struts 16 and 17 respectively interposed between the compression and tension members of the trusses. A brake head 18 is secured upon each end of each of the brake beams. Brake hangers in the form of links 19 depend from the upper portions of the side frames and carry the brake beams and the trusses of which these beams are parts, said hangers being suitably received, at their lower ends, in notches provided in the brake heads. Brakes in the form of shoes 20 are carried upon the brake heads in a position to be applied to the car wheels when the trussed brake beams are moved toward the wheels. The truck bolster and spring plank are between the beams.

The brake actuating and releasing rod 21 is connected with the upper end of the live brake lever 22 which is pivotally connected between its ends at 23 with the strut 16 through which this lever desirably passes. The lower end of this lever is pivotally connected, at a selected place, with one end of the connecting rod 24, as indicated at 25. The other end of this connecting rod is similarly connected with the lower end of the dead brake lever 26, as indicated at 27. The lever 26 is pivotally connected, between its ends, with the strut 17, as indicated at 28. The upper end of the dead lever 26 is connected at a selected place with the dead lever guide or stop 29, indicated at 30, this guide or stop being pivotally connected, at its inner end, with the bracket 31 which is carried by the truck bolster. The brake beam 12 is directly controlled by the live lever 22 and strut 16 which indirectly control the movement of the brake beam 13 through the intermediation of the connecting rod 24, the dead lever 26 and strut 17.

The struts 16 and 17 respectively terminate, at their inner ends, in sleeves 32 and 33 through which the corresponding brake beams 12 and 13 are respectively passed in effecting assembly thereof with said struts. Arms 34 and 35 are integrally formed with said sleeves at their outer ends and are mutually approached at their inner ends which underlie the spring plank. A unitary element 36 is carried by the spring plank and is preferably of flattened V-form so as to present inclined downwardly converging faces to the approached ends of said arms that cooperate therewith to guide the brake beams in their movements in a manner to maintain proper relation between the brake shoes, upon the ends of the brake beams, with the car wheels.

This unitary element is desirably formed integrally with the spring plank which, itself, is preferably formed of pressed sheet steel in which event the element 36 is downwardly pressed from the bottom side of the plank at the middle thereof.

The ends of the arms which engage the formations at 36 may be provided with removable wearing shoes 37, Fig. 3, which may be provided with pins 38 receivable within holes 39 in said arms. When these shoes have become worn, they may be replaced. To prevent the connecting rod 24 from dropping, in the event of breakage, I provide stirrups 40 upon the longitudinal sides of the spring plank whose bottom sides underlie the connecting rod to limit the downward movement thereof.

Changes may be made without departing from the invention.

Having thus described my invention, I claim:

1. In a brake mechanism for railway cars, a spring plank, a truss structure comprising a compression member, a tension member and a strut between said members, and an extension carried by said strut cooperating with said spring plank to guide the movement of said truss structure.

2. In a brake mechanism for railway cars, a spring plank, a truss structure comprising a compression member, a tension member and a strut between said members, and an arm carried by said strut extending beneath said spring plank and cooperating therewith to guide the movement of said truss structure.

3. In a brake mechanism for railway cars, a spring plank having a portion thereof pressed to provide an inclined bottom surface, a truss structure which is inclusive of a compression member, a tension member and a strut between said members, and an arm carried by said strut extending beneath said spring plank and slidably engaging the inclined bottom surface thereof to guide the movement of the truss structure.

4. In a brake mechanism for railway cars, a truss strut having a sleeve formation, a brake beam extending through said sleeve formation and constituting a truss compression member, said strut further including an arm extending inwardly from said sleeve formation for cooperation with a portion of the car truck to guide the movement of said strut thereby to guide the movement of the brake beam.

5. In a brake mechanism for railway cars, a truss including a strut having a formation for connection with a brake beam which latter constitutes the compression member of the truss, a truss tension member, means at the outer end of the strut for connection with the tension member, and means at the inner end of said strut for engagement with a portion of a car truck to guide the movement of the strut thereby to guide the movement of the brake beam.

In witness whereof, I hereunto subscribe my name.

HERMAN C. PRIEBE.